(12) United States Patent
Hanrahan et al.

(10) Patent No.: US 6,399,179 B1
(45) Date of Patent: Jun. 4, 2002

(54) BASE PLATE FOR SUSPENSION ASSEMBLY IN HARD DISK DRIVE WITH STRESS ISOLATION

(75) Inventors: Kevin Hanrahan; Ryan Schmidt, both of Santa Barbara; William P. Heist, Morgan Hill; Larry Tucker, Fremont; Kim Aimonetti, San Jose, all of CA (US)

(73) Assignees: Intri-Plex Technologies, Inc., Santa Barbara; Read-Rite Corporation, Milpitas, both of CA (US)

( * ) Notice: Subject to any disclaimer, the term of this patent is extended or adjusted under 35 U.S.C. 154(b) by 0 days.

(21) Appl. No.: 09/488,204

(22) Filed: Jan. 19, 2000

Related U.S. Application Data (63) Continuation-in-part of application No. 09/055,117, filed on Apr. 3, 1998, now abandoned.

(51) Int. Cl.[7] .................................................. G11B 5/48
(52) U.S. Cl. ........................ 428/131; 428/596; 428/597; 428/131; 360/97.01; 360/97.02; 360/97.03; 360/104; 360/105; 360/106
(58) Field of Search ................................ 360/104, 105, 360/106, 97.01, 97.02, 97.03; 428/131, 596, 597; 369/75.1

(56) References Cited

U.S. PATENT DOCUMENTS 6,046,885 A * 4/2000 Aimonetti .................... 360/104

FOREIGN PATENT DOCUMENTS

JP 08-249848 * 9/1996 ............ G11B/21/21

* cited by examiner

*Primary Examiner*—Harold Pyon
*Assistant Examiner*—Shalie Manlove
(74) *Attorney, Agent, or Firm*—Owen L. Lamb (57) ABSTRACT

A base plate comprising a hub, a flange having an outer flange region at an outer periphery of the flange and a clamping region that surrounds and is contiguous with the hub. A strain isolation region of the flange surrounds and is contiguous with the clamping region. The strain isolation region has a stress-reducing configuration that provides alternately patterned continuity areas and discontinuity areas between the modified region and adjacent areas of the outer flange region and the clamping region. The strain isolation region may be either a series of holes in the flange surrounding the clamping region, or a number of arcuate slots cut completely through the flange surrounding the clamping region.

17 Claims, 6 Drawing Sheets

BASE PLATE FOR SUSPENSION ASSEMBLY IN HARD DISK DRIVE WITH STRESS ISOLATION

CROSS-REFERENCE TO REATED APPLICATIONS

This application is a continuation-in-part of Aimonetti, et al. U.S. application Ser. No. 09/055,117 entitled "Base Plate For Suspension Assembly In Hard Disk Drive With Stress Isolation" filed Apr. 3, 1998 now ABN which is incorporated herein by reference.

BACKGROUND OF THE INVENTION

1. Field of the Invention

This invention relates to disk head assemblies for supporting read/write heads adjacent rotating disks in disk drives and more particularly, to a base plate for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram Load". Air turbulence caused by the rotating disks lifts the heads slightly off of the disks so that the heads fly on an air bearing across the disk surfaces. The air bearing force is counteracted by the suspension gram load.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension has the hub of the base plate extending through and beyond the load beam clearance hole.

The hubs of two suspensions are inserted into an actuator arm boss hole formed through an actuator arm extending from an actuator body, one hub entering an actuator arm boss hole from each end of the hole. In the prior art, a swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

Problems with this method of mounting transducer heads have arisen as the need for increased data storage capacity in hard disk drives has grown and/or the size of the disk drive has decreased to fit in small lap top computers. The problem of forming a strong connection between the actuator arms and the transducer suspensions has been made more difficult as the thickness of the components has become smaller.

A typical base plate has two primary regions, a flange region and a hub region. The flange region is a flat portion to which the load beam is welded. This area preferably remains flat and free from distortion so that it serves as a stable mounting feature for the load beam and ideally remains so throughout the swaging operation. The hub region is an extended boss whose upper end is contiguous with the flange portion and whose lower end passes through boss clearance holes in both the load beam and the actuator arm. The hub region supplies the retention torque between the base plate, which is welded to the load beam, and the actuator arm by plastically expanding and cold working during the swaging operation, creating a press fit with the actuator arm. A problem with this process is that the base plate flange becomes warped by stress from the hub during the swaging operation. Consequently, the load beam, which is welded to the base plate flange, is deformed by the warping of the base plate flange, adversely affecting the gram load on the transducer head.

U.S. Pat. No. 5,602,698 granted to Miyazaki, et al. on Feb. 11, 1997 there is provided an actuator arm assembly for a magnetic disk unit including a base and an actuator arm assembly rotatably mounted on the base. The actuator arm assembly has a first hole at one end thereof; a load beam supporting a magnetic head at one end thereof and a second hole at the other end. A spacer (base plate) is secured to the other end of the load beam and is fastened to the one end of the actuator arm. The spacer includes a flat portion, a cylindrical portion integral with the flat portion, and an annular groove formed between the cylindrical portion and the flat portion. A single or plurality of annular grooves may be formed in the flat portion of the spacer. In place of the annular groove or grooves, a plurality of linear grooves may be formed in the flat portion of the spacer. Additionally, the spacer includes a reinforcement rib formed on an outer periphery of the flat portion.

Cutting an annular groove or grooves in a base plate flange removes material and tends to weaken the flange. Thus the flange must be made thicker or ribs must be provided to reinforce the flange as shown in the Miyazaki, et al. patent. A disadvantage of this approach is that the ribs add to the overall thickness of the base plate which results in an increase in the overall height of a head stack assembly (HSA) in a fully assembled disk drive. This makes the prior art approach unacceptable in HSAs for note book sized computers. Also, since the annular or linear grooves tend to weaken the base plate, a thicker base plate is needed to overcome this effect, again making the prior art approach unacceptable in HSAs for note book sized computers. Additionally, it is expensive to make annular or linear grooves in a base plate.

It is an object of this invention to isolate the plastic flow of material in the hub region of the base plate from affecting the flange region and consequently reducing the amount of gram load change resulting from the swage process, without increasing the thickness of the flange.

SUMMARY OF THE INVENTION

Briefly, the invention is concerned with a base plate comprising a hub and a flange. The flange has an outer flange region at an outer periphery of the flange and a clamping region that surrounds and is contiguous with the hub. The flange has a strain isolation region that surrounds and is contiguous with the clamping region. The strain isolation region has a stress-reducing configuration that provides alternately patterned areas of continuity and areas of discontinuity between the strain isolation region and adjacent areas of the outer flange region and the clamping region.

In accordance with an aspect of the invention the discontinuity areas are slots and the continuity areas are spaces between the slots.

In accordance with an aspect of the invention the discontinuity areas are holes and the continuity areas are spaces between the holes.

The invention has the advantage that when swaging, the swage force and plastic flow in the hub region are isolated from the flange region.

An advantage of this invention is that a superior retention torque to swage force ratio is achieved with a lower gram load change.

An advantage of this invention is that the strain isolation region provides a region of strain isolation between the outer portion of the flange where the load beam is welded and the inner portion of the flange which is clamped fully thereby reducing outer flange deformation and gram load loss.

BRIEF DESCRIPTION OF THE DRAWINGS

The invention will be described in greater detail with reference to the drawings in which:

FIG. 5c is bottom perspective view of the base plate of FIG. 5a; and,

FIG. 5d is top perspective view of the base plate of FIG. 5a.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Holes Strain Isolation Region

Figure 1A:
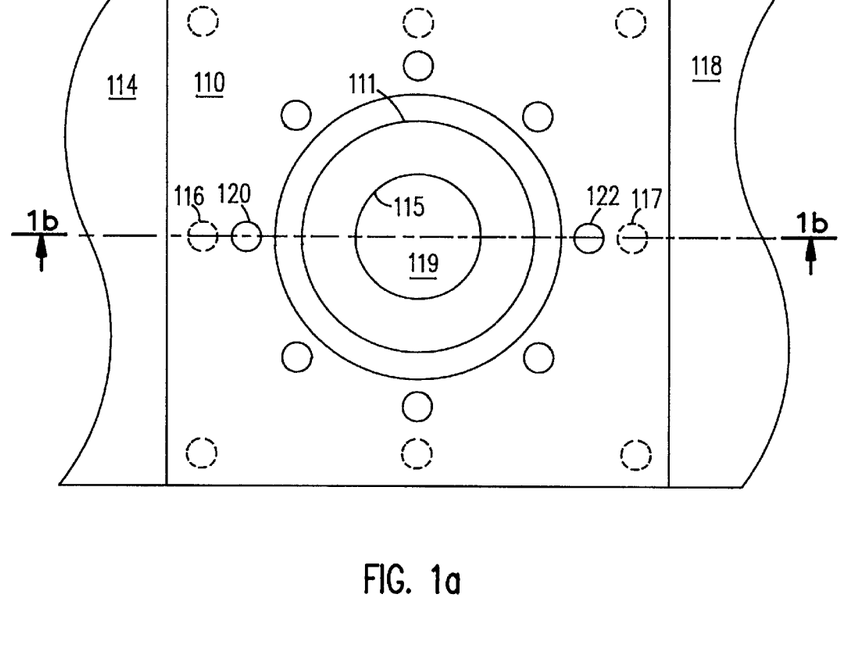
FIG. 1a is top view of a base plate illustrating a first embodiment of the invention.
Figure 1B:
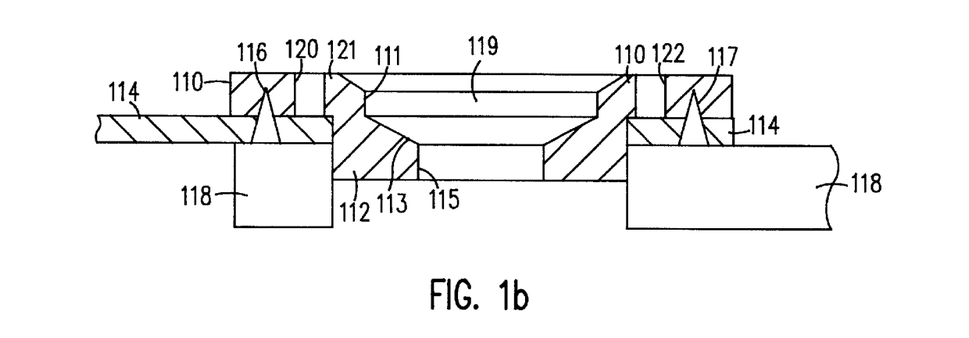
FIG. 1b is side elevation view of the base plate of FIG. 1a along the view line 1b—1b.

Refer to FIGS. 1a and 1b. A first embodiment of the invention employs a pattern of stamped or drilled holes 120, 122, etc. around the a clamping region around the hub which serve to make that region a strain isolation region between the flange and boss thereby reducing flange deformation and gram load loss.

An actuator arm and load beam, which are elements of an actuator arm assembly, are connected end to end by a base plate. The base plate includes a flat flange portion 110 and a cylindrical hub portion or boss 112. A base plate typically has an inner barrel shape with a counter bore 111, a lead-in chamfer 113, and an inner diameter 115. The counter bore and inner diameter are perpendicular to the plane of the base plate flange 110. In assembling the actuator arm, the hub 112 is inserted through a load beam boss hole in a load beam 114 and the flange portion 110 is welded, 116, 117, to the load beam. Eight welds are illustrated by the broken line circles in FIG. 1a. The hub is then inserted through an actuator arm boss hole in the actuator arm 118. A swage ball tool is passed through the center inner barrel 119 of the hub 112 causing pressure to be applied to cause the hub 112 to expand into the boss hole in the actuator arm, rigidly connecting the hub and attached load beam to the actuator arm boss hole.

When a swage ball is forced through the inner barrel, the applied swage force and resulting stress tends to strain or deform the base plate flange region. The holes 120, 122, etc. create a strain isolation region, which isolates the flange region 110 from the clamping region 121, and hence from stress the hub region 112. The purpose of this geometry is so that when the swage ball is driven through the barrel 119 of the hub, the part will behave so as to keep the stress away from the flange 110.

Slotted Pattern Strain Isolation Region

A pattern of slots is made through the flange portion of the base plate surrounding the boss, cutting through the base plate flange between the boss outer diameter and the outer edge of the base plate flange. The advantage is radial symmetry for the suspension assembly. The pattern of slots creates a strain isolation region which isolates the flange region from the clamping region, and hence from stress in the hub region. Three patterns are disclosed in FIGS. 2a and 2b, 3a and 3b, and 4a and 4b.

Figure 2A:
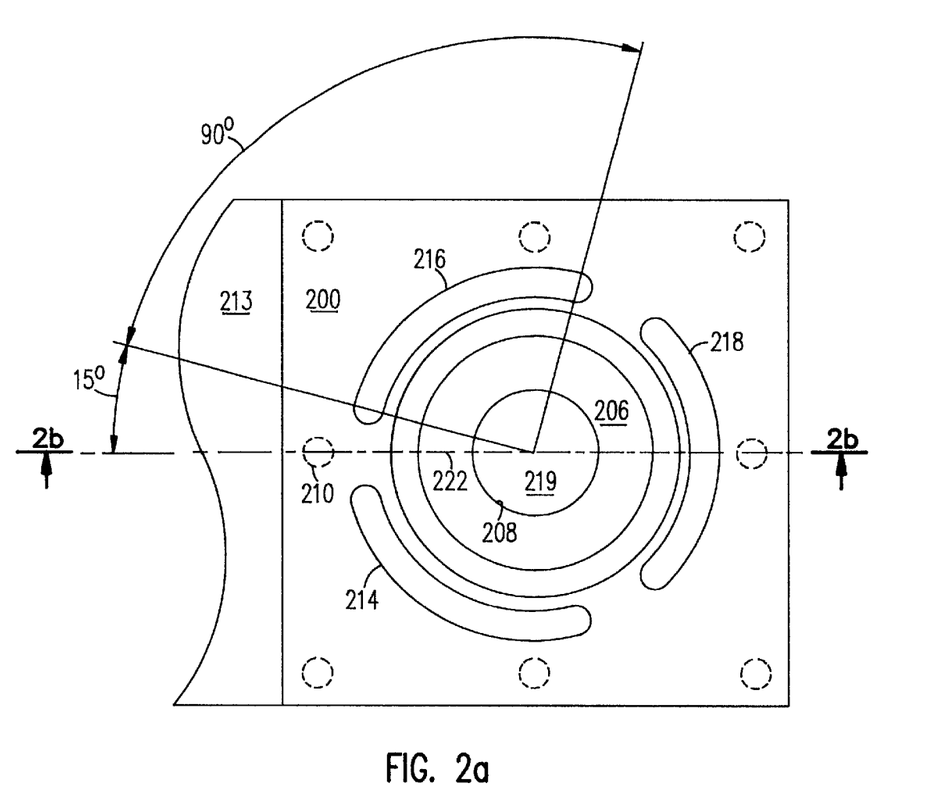
FIG. 2a is bottom view of a base plate illustrating a second embodiment of the invention.
Figure 2B:
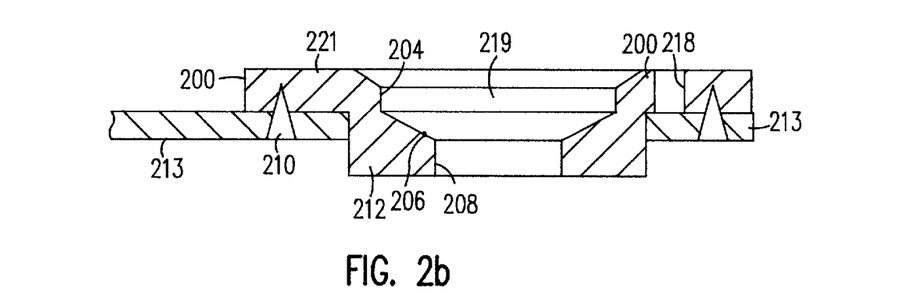
FIG. 2b is side elevation view of a base plate of FIG. 2a along the view line 2b—2b.

Refer to FIGS. 2a and 2b. An actuator arm and load beam, which are elements of an actuator arm assembly, are connected end to end by a base plate. This base plate includes a flat flange portion 200 and a cylindrical hub portion or boss 202. The base plate has an inner barrel shape with a counter bore 204, a lead-in chamfer 206 and an inner diameter 208. The counter bore and inner diameter are perpendicular to the plane of the base plate flange 200. In assembling the actuator arm, the hub 212 is inserted through a load beam boss hole in a load beam and the flange portion 200 is welded to the load beam with, for example, eight welds. The location of the eight welds is illustrated by the broken line circles 216, 217, etc. in FIG. 2a. The hub is then inserted through an actuator arm boss clearance hole in the actuator arm (not shown). A swage ball tool is passed through the center inner barrel 219 of the hub 212 causing pressure to be applied to cause the hub to expand into the boss hole in the actuator arm, rigidly connecting the hub and attached load beam to the actuator arm boss hole.

When a swage ball is forced through the inner barrel 219, the applied swage force and resulting stress tends to strain or deform the base plate flange region. A slotted pattern strain isolation region isolates the flange region 200 from the clamping region 221 and hence from stress in the hub region 212. The slotted pattern is made up of three slots 214, 216, 218, each slot spanning an arc of 90 degrees. The second slot 218 is centered on the transverse centerline 222 of the load beam.

Figure 3A:
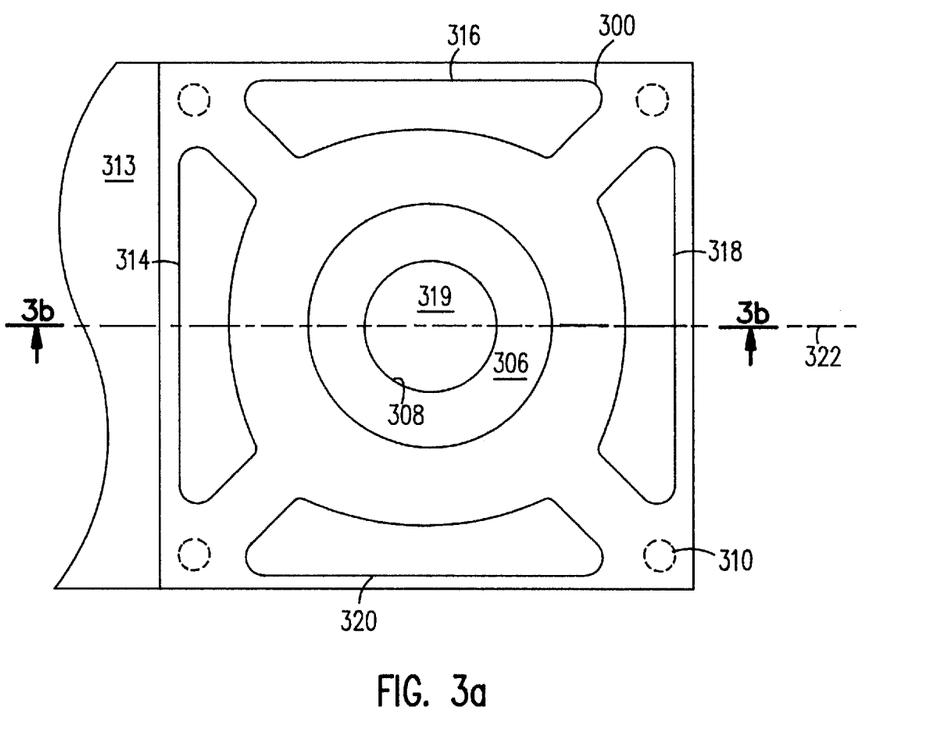
FIG. 3a is bottom view of a base plate illustrating a third embodiment of the invention.
Figure 3B:
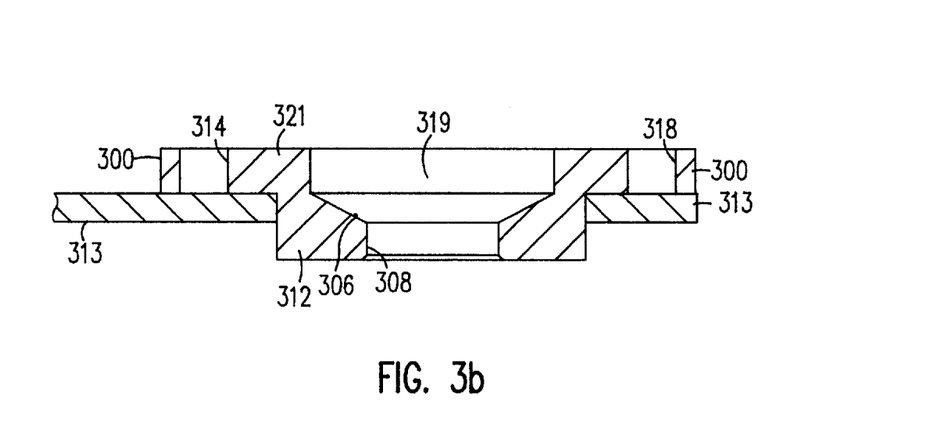
FIG. 3b is side elevation view of a base plate of FIG. 3a along the view line 3b—3b.

Refer to FIGS. 3a and 3b. This base plate includes a flat flange portion 300 and a cylindrical hub portion or boss 312. The base plate has an inner barrel shape with a counter bore 304, a lead-in chamfer 306 and an inner diameter 308. The counter bore and inner diameter are perpendicular to the plane of the base plate flange 300. In assembling the actuator arm, the hub 312 is inserted through a load beam boss hole in a load beam and the flange portion 300 is welded to the load beam with, for example, eight welds. The location of the eight welds is illustrated by the broken line circles 310 in FIG. 3*a*. The hub is then inserted through an actuator arm boss clearance hole in the actuator arm (not shown). A swage ball tool is passed through the center inner barrel 319 of the hub 312 causing pressure to be applied to cause the hub 312 to expand into the boss hole in the actuator arm, rigidly connecting the hub and attached load beam to the actuator arm boss hole.

When a swage ball is forced through the inner barrel, the applied swage force or stress tends to strain or deform the base plate flange region 300 as the force is transmitted. The slotted pattern strain isolation region isolates the flange region 300 and the hub region 312 from stress. The slotted pattern is made up of four slots 314, 316, 318, 320, each slot spanning an arc of 60 degrees. The slots are spaced 30 degrees apart. The first slot 314 and third slot 318 are centered on the transverse centerline 322 of the load beam.

Figure 4A:
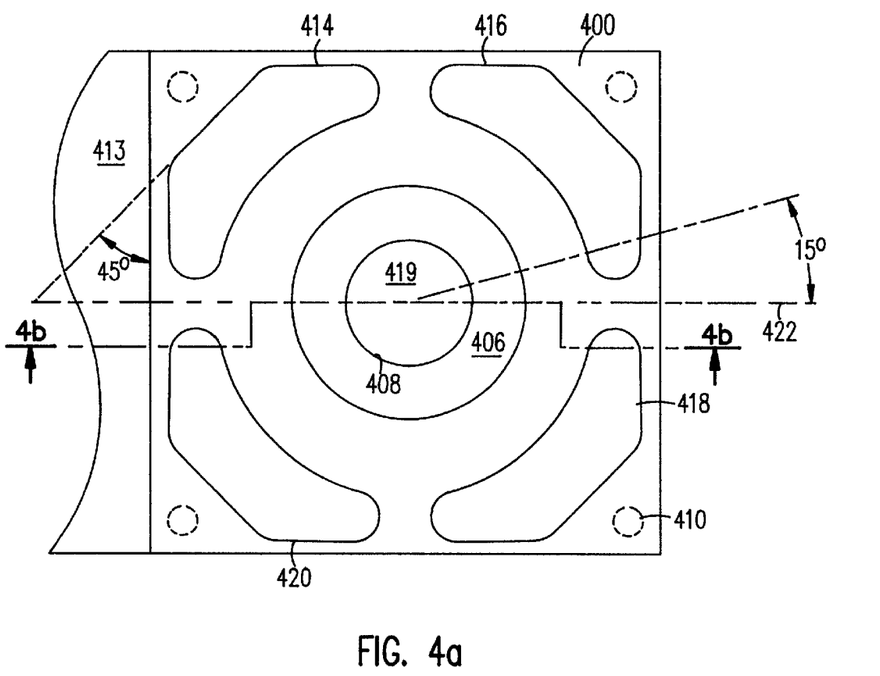
FIG. 4a is bottom view of a base plate illustrating a fourth embodiment of the invention.
Figure 4B:
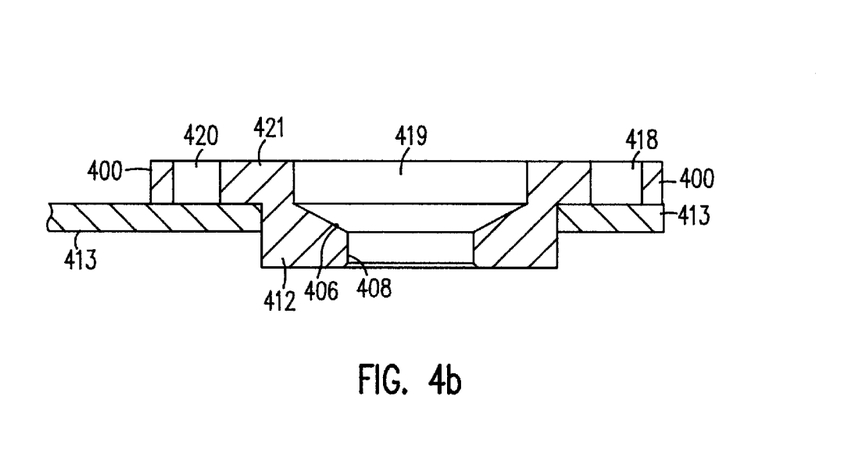
FIG. 4b is side elevation view of the base plate of FIG. 4a along the view line 4b—4b.
Figure 5A:
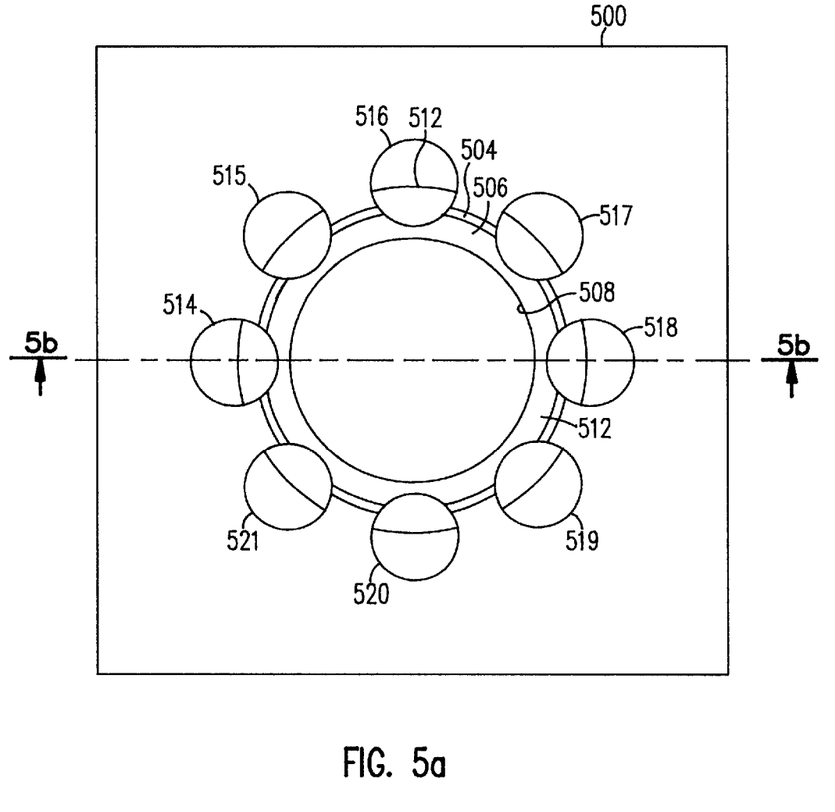
FIG. 5a is bottom view of a base plate illustrating a fifth embodiment of the invention.
Figure 5B:
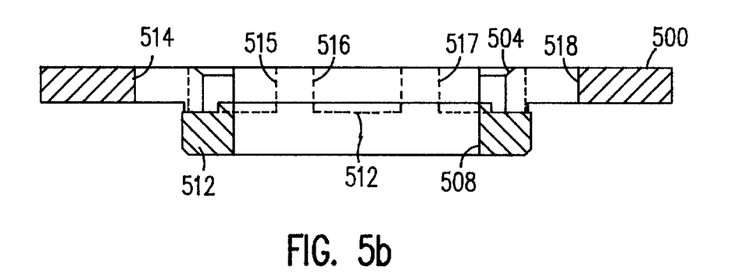
FIG. 5b is side elevation view of the base plate of FIG. 5a along the view line 5b—5b.
Figure 5C:
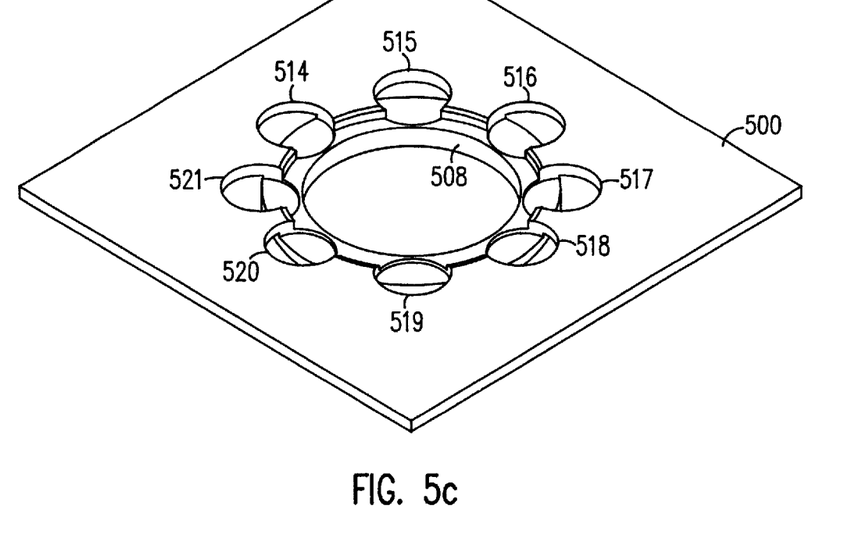
Figure 5D:
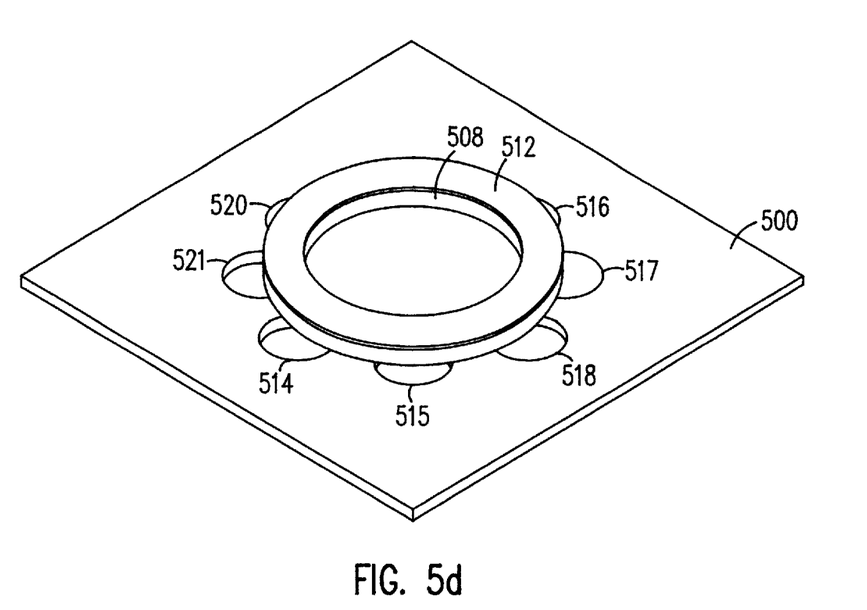

Refer to FIGS. 4*a* and 4*b*. This base plate includes a flat flange portion 400 and a cylindrical hub portion or boss 412. The base plate has an inner barrel shape with a counter bore 411, a lead-in chamfer 406 and an inner diameter 408. The counter bore and inner diameter are perpendicular to the plane of the base plate flange 400. In assembling the actuator arm, the hub 412 is inserted through a load beam boss hole in a load beam 413 and the flange portion 400 is welded to the load beam 413 with, for example, eight welds. The location of the eight welds is illustrated by the broken line circles 410 in FIG. 4*a*. The hub is then inserted through an actuator arm boss hole in the actuator arm (not shown). A swage ball tool is passed through the center inner barrel 419 of the hub 412 causing pressure to be applied to cause the hub to expand into the boss hole in the actuator arm, rigidly connecting the hub and attached load beam to the actuator arm boss hole.

When a swage ball is forced through the inner barrel, the applied swage force or stress tends to strain or deform the base plate flange region 400 as the force is transmitted. The slotted pattern strain isolation region isolates the flange region 400 and the hub region 412 from stress. The slotted pattern is made up of four slots 414, 416, 418, 420, each slot spanning an arc of 60 degrees. The slots are spaced 30 degrees apart. The first slot 414 and second slot 416 are offset +15 degrees from the transverse centerline 422 of the load beam. The third slot 418 and fourth slot 420 are offset −15 degrees from the transverse centerline 422 of the load beam.

Relief Holes Strain Isolation Region

Refer to FIGS. 5*a*–5*d*. This base plate includes a flat flange portion 500 and a cylindrical hub portion or boss 512. The base plate has an inner barrel shape with a counter bore 504, a lead-in chamfer 506 and an inner diameter 508. The counter bore and inner diameter are perpendicular to the plane of the base plate flange 500.

In assembling the actuator arm, the hub 512 is inserted through a load beam boss hole in a load beam and the flange portion 500 is welded to the load beam. The hub is then inserted through an actuator arm boss hole in the actuator arm. A swage ball tool is passed through the center inner barrel 519 of the hub 512 causing pressure to be applied to cause the hub to expand into the boss hole in the actuator arm, rigidly connecting the hub and attached load beam to the actuator arm boss hole.

When a swage ball is forced through the inner barrel, the applied swage force or stress tends to strain or deform the base plate flange region 500 as the force is transmitted. The relief hole strain isolation region isolates the flange region 500 and the hub region 512 from stress. The relief hole strain isolation region is made up of eight relief holes 514, 515, 516, 517, 518, 519, 521, 520, each hole piercing through the flange 500 partially within the area where the hub meets the flange, and partially within the clamping region of the flange, the holes extending part way into the hub 512. In FIGS. 5*a*–5*d*, the discontinuity areas are the relief holes and the continuity areas are spaces between the holes.

SUMMARY

To summarize, the invention is concerned with a base plate comprising a hub and a flange. The flange has an outer flange region at an outer periphery of the flange and a clamping region that surrounds and is contiguous with the hub. The flange has a stress reducing region that surrounds and is contiguous with the clamping region. The stress-reducing region has a configuration that provides alternately patterned areas of continuity and areas of discontinuity between the stress reducing region and adjacent areas of the outer flange region and the clamping region. The discontinuity areas may be holes or slots, or combinations of holes and slots and the continuity areas are spaces between the holes or slots.

In FIGS. 1*a* and 1*b*, the discontinuity areas are holes 120 and the continuity areas are spaces between the holes.

In FIGS. 2*a* and 2*b*, the discontinuity areas are three arcuate slots or impressions 214, 216, and 218 and the continuity areas are spaces between the slots or impressions.

In FIGS. 3*a* and 3*b*, the discontinuity areas are four arcuate slots or impressions 314, 316, 318 and 320 and the continuity areas are spaces between the slots or impressions.

In FIGS. 4*a* and 4*b*, the discontinuity areas are four arcuate slots or impressions 414, 416, 418 and 420 and the continuity areas are spaces between the slots or impressions.

In FIGS. 5*a*–5*d*, the discontinuity areas are holes 514–521 and the continuity areas are spaces between the holes.

While the invention has been particularly shown and described with reference to preferred embodiments thereof, it will be understood by those skilled in the art that the foregoing and other changes in form and detail may be made therein without departing from the scope of the invention.

What is claimed is:

1. A base plate comprising:

a hub; and, a flange;

said flange having an outer flange region at an outer periphery of said flange and a clamping region that surrounds and is contiguous with said hub;

said flange having a strain isolation region that surrounds and is contiguous with said clamping region, said strain isolation region having a stress reducing configuration that provides alternately patterned areas of continuity and areas of discontinuity between said strain isolation region and adjacent areas of said outer flange region and said clamping region;

said areas of discontinuity extending completely through said base plate.

2. The base plate of claim 1 wherein:

said strain isolation region is made up of relief holes, each hole piercing through said flange partially within an area where said hub meets said flange, and partially within said clamping region of the flange, said holes extending part way into said hub.

3. The base plate of claim 1 wherein:

said areas of discontinuity are holes; and, said areas of continuity are spaces between said holes.

4. The base plate of claim 1 wherein:

said holes are slots; and, said areas of continuity are spaces between said slots.

5. The base plate of claim 1, further comprising:

wherein, said outer flange region is fixed to the load beam.

6. The base plate of claim 2, further comprising:

wherein, said outer flange region is fixed to the load beam.

7. The base plate of claim 3, further comprising:

wherein, said outer flange region is fixed to the load beam.

8. The base plate of claim 4, further comprising:

wherein, said outer flange region is fixed to the load beam.

9. The base plate of claim 4 wherein:

said slots are a number of arcuate slots cut through said flange.

10. The base plate of claim 1 wherein said discontinuity areas are made up of three slots, each slot spanning an arc of 90 degrees, said slots being spaced 30 degrees apart, one of said slots being centered on a transverse centerline of said base plate.

11. The base plate of claim 1 wherein said discontinuity areas are made up of four slots, a first slot and a third slot being centered on a transverse centerline of said base plate.

12. The base plate of claim 1 wherein said discontinuity areas are made up of four slots, a first slot and a second slot being offset +15 degrees from a transverse centerline of said base plate and a third slot and a fourth slot being offset −15 degrees from said transverse centerline.

13. A base plate comprising:

a hub; and, a flange;

said flange having an outer flange region at an outer periphery of said flange and a clamping region that surrounds and is contiguous with said hub;

said flange having a strain isolation region made up of relief holes, each hole piercing through said flange from a side of said flange that is opposite said hub, said holes partially within an area where said hub meets said flange, and partially within said clamping region of the flange, that surrounds and is contiguous with said hub.

14. The base plate of claim 13 wherein said holes extend part way into said hub.

15. The base plate of claim 13, further comprising:

wherein, said outer flange region is fixed to the load beam.

16. The base plate of claim 14, further comprising:

wherein, said outer flange region is fixed to the load beam.

17. A base plate comprising:

a hub; and, a flange;

said flange having an outer flange region at an outer periphery of said flange and a clamping region that surrounds and is contiguous with said hub;

said flange having a strain isolation region that surrounds and is contiguous with said clamping region, said strain isolation region having a stress reducing configuration that provides alternately patterned areas of continuity and areas of discontinuity between said strain isolation region and adjacent areas of said outer flange region and said clamping region;

said areas of discontinuity extending completely through said base plate to form holes through said base plate.

* * * * *